(12) United States Patent
Ferro et al.

(10) Patent No.: US 8,918,336 B2
(45) Date of Patent: Dec. 23, 2014

(54) ENERGY TRANSACTION BROKER FOR BROKERING ELECTRIC VEHICLE CHARGING TRANSACTIONS

(75) Inventors: Erica Haefner Ferro, Boulder, CO (US); Allan James Schurr, Castle Rock, CO (US); Mark William Trekell, Aurora, CO (US); Paul Stuart Williamson, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1367 days.

(21) Appl. No.: 12/194,290

(22) Filed: Aug. 19, 2008

(65) Prior Publication Data

US 2010/0049639 A1   Feb. 25, 2010

(51) Int. Cl.

| G07F 19/00 | (2006.01) |
|---|---|
| H04M 15/00 | (2006.01) |
| G06Q 20/10 | (2012.01) |
| G06Q 30/08 | (2012.01) |
| G06Q 10/06 | (2012.01) |
| G06Q 30/04 | (2012.01) |
| G06Q 50/30 | (2012.01) |

(52) U.S. Cl.
CPC ............ *G06Q 10/06* (2013.01); *G06Q 20/102* (2013.01); *G06Q 30/08* (2013.01); *G06Q 30/04* (2013.01); *G06Q 50/30* (2013.01)
USPC ................. 705/34; 705/1.1; 705/30; 705/55; 361/212; 361/230; 361/233; 361/255

(58) Field of Classification Search
None
See application file for complete search history.

(56) References Cited

U.S. PATENT DOCUMENTS

| 3,867,682 | A | 2/1975 | Yamauchi et al. |
|---|---|---|---|
| 4,306,156 | A | 12/1981 | Monaco et al. |
| 4,351,405 | A | 9/1982 | Fields et al. |
| 4,389,608 | A | 6/1983 | Dahl et al. |
| 4,433,278 | A | 2/1984 | Lowndes et al. |

(Continued)

FOREIGN PATENT DOCUMENTS

| AU | 2003208173 A1 | 9/2003 |
|---|---|---|
| JP | 2000279519 A | 10/2000 |

(Continued)

OTHER PUBLICATIONS

U.S. Appl. No. 12/139,562, filed Jun. 16, 2008, Hafner et al.

(Continued)

*Primary Examiner* — Fateh Obaid
(74) *Attorney, Agent, or Firm* — Yee & Associates, P.C.; Parashos T. Kalaitzis

(57) ABSTRACT

A computer implemented method, apparatus, and computer usable program code for brokering a charging process of an electric vehicle. In one embodiment, a process extracts event data associated with the charging process from a charge notification in response to receiving the charge notification indicating that the charging process of the electric vehicle is complete. The event data may include, but is not limited to, duration of the charging process, quantity of electricity transferred, or rate at which electricity was transferred during the charging process. The process then identifies, from an energy transaction plan, a set of payees participating in the charging process. Thereafter, the process disburses a payment owed to the set of payees. An amount of the payment is calculated using payment terms in profiles of the set of payees. The payment includes funds from at least one of a payer fund and an incentive fund.

20 Claims, 6 Drawing Sheets

(56) References Cited

U.S. PATENT DOCUMENTS

| | | |
|---|---|---|
| 4,532,418 A | 7/1985 | Meese et al. |
| 5,049,802 A | 9/1991 | Mintus et al. |
| 5,184,058 A | 2/1993 | Hesse et al. |
| 5,343,970 A | 9/1994 | Severinsky |
| 5,359,228 A | 10/1994 | Yoshida |
| 5,422,624 A | 6/1995 | Smith |
| 5,441,122 A | 8/1995 | Yoshida |
| 5,487,002 A | 1/1996 | Diller et al. |
| 5,492,189 A | 2/1996 | Kriegler et al. |
| 5,492,190 A | 2/1996 | Yoshida |
| 5,548,200 A | 8/1996 | Nor et al. |
| 5,563,491 A | 10/1996 | Tseng |
| 5,566,774 A | 10/1996 | Yoshida |
| 5,594,318 A | 1/1997 | Nor et al. |
| 5,627,752 A | 5/1997 | Buck et al. |
| 5,642,270 A | 6/1997 | Green et al. |
| 5,675,205 A | 10/1997 | Jacob et al. |
| 5,736,833 A | 4/1998 | Farris |
| 5,778,326 A | 7/1998 | Moroto et al. |
| 6,067,008 A | 5/2000 | Smith |
| 6,081,205 A | 6/2000 | Williams |
| 6,225,776 B1 | 5/2001 | Chai |
| 6,234,932 B1 | 5/2001 | Kuroda et al. |
| 6,252,380 B1 | 6/2001 | Koenck |
| 6,278,915 B1 | 8/2001 | Deguchi et al. |
| 6,285,931 B1 | 9/2001 | Hattori et al. |
| 6,301,531 B1 | 10/2001 | Pierro et al. |
| 6,307,349 B1 | 10/2001 | Koenck et al. |
| 6,373,380 B1 | 4/2002 | Robertson et al. |
| 6,434,465 B2 | 8/2002 | Schmitt et al. |
| 6,456,041 B1 | 9/2002 | Terada et al. |
| 6,466,658 B2 | 10/2002 | Schelberg, Jr. et al. |
| 6,480,767 B2 | 11/2002 | Yamaguchi et al. |
| 6,487,477 B1 | 11/2002 | Woestman et al. |
| 6,586,866 B1 | 7/2003 | Ikedo et al. |
| 6,609,582 B1 | 8/2003 | Botti et al. |
| 6,614,204 B2 | 9/2003 | Pellegrino et al. |
| 6,629,024 B2 | 9/2003 | Tabata et al. |
| 6,727,809 B1 | 4/2004 | Smith |
| 6,741,036 B1 | 5/2004 | Ikedo et al. |
| 6,766,949 B2 * | 7/2004 | Terranova et al. .............. 235/384 |
| 6,789,733 B2 | 9/2004 | Terranova et al. |
| 6,794,849 B2 | 9/2004 | Mori et al. |
| 6,850,898 B1 | 2/2005 | Murakami et al. |
| 6,909,200 B2 | 6/2005 | Bouchon |
| 6,915,869 B2 | 7/2005 | Botti et al. |
| 7,013,205 B1 | 3/2006 | Hafner et al. |
| 7,027,890 B2 | 4/2006 | Wilson |
| 7,039,389 B2 | 5/2006 | Johnson, Jr. |
| 7,049,720 B2 | 5/2006 | Darday |
| 7,178,616 B2 | 2/2007 | Botti et al. |
| 7,216,729 B2 | 5/2007 | Syed et al. |
| 7,243,010 B2 | 7/2007 | Tabata et al. |
| 7,309,966 B2 | 12/2007 | Wobben |
| 7,402,978 B2 * | 7/2008 | Pryor ........................... 320/104 |
| 7,565,396 B2 | 7/2009 | Hoshina |
| 7,674,536 B2 | 3/2010 | Chipchase et al. |
| 7,693,609 B2 * | 4/2010 | Kressner et al. .............. 700/291 |
| 7,698,078 B2 | 4/2010 | Kelty et al. |
| 7,740,092 B2 | 6/2010 | Bender |
| 7,885,893 B2 | 2/2011 | Alexander |
| 7,949,435 B2 | 5/2011 | Pollack et al. |
| 7,956,570 B2 | 6/2011 | Lowenthal et al. |
| 7,991,665 B2 | 8/2011 | Hafner et al. |
| 8,054,048 B2 | 11/2011 | Woody et al. |
| 8,103,386 B2 | 1/2012 | Ichikawa et al. |
| 8,103,391 B2 | 1/2012 | Ferro et al. |
| 2002/0062183 A1 | 5/2002 | Yamaguchi et al. |
| 2002/0064258 A1 * | 5/2002 | Schelberg et al. ......... 379/91.01 |
| 2002/0116099 A1 | 8/2002 | Tabata et al. |
| 2002/0153726 A1 | 10/2002 | Sumner |
| 2003/0137277 A1 | 7/2003 | Mori et al. |
| 2003/0153278 A1 * | 8/2003 | Johnson, Jr. .................. 455/74 |
| 2003/0168263 A1 | 9/2003 | Botti et al. |
| 2003/0205619 A1 | 11/2003 | Terranova et al. |
| 2004/0046506 A1 | 3/2004 | Kawai et al. |
| 2004/0055586 A1 | 3/2004 | Botti et al. |
| 2004/0062059 A1 | 4/2004 | Cheng et al. |
| 2004/0158365 A1 | 8/2004 | Tabata et al. |
| 2004/0265671 A1 * | 12/2004 | Chipchase et al. .............. 429/34 |
| 2005/0008904 A1 | 1/2005 | Suppes |
| 2005/0024189 A1 | 2/2005 | Weber |
| 2005/0044245 A1 | 2/2005 | Hoshina |
| 2005/0104465 A1 | 5/2005 | Darday |
| 2005/0231119 A1 | 10/2005 | Ito et al. |
| 2005/0234776 A1 | 10/2005 | Jacoves et al. |
| 2006/0182241 A1 | 8/2006 | Schelberg, Jr. et al. |
| 2006/0282381 A1 * | 12/2006 | Ritchie ........................... 705/42 |
| 2006/0287783 A1 | 12/2006 | Walker |
| 2007/0068714 A1 | 3/2007 | Bender |
| 2007/0126395 A1 | 6/2007 | Suchar |
| 2007/0282495 A1 | 12/2007 | Kempton et al. |
| 2008/0039979 A1 | 2/2008 | Bridges et al. |
| 2008/0039989 A1 | 2/2008 | Pollack et al. |
| 2008/0040223 A1 | 2/2008 | Bridges et al. |
| 2008/0040295 A1 * | 2/2008 | Kaplan et al. .................. 705/412 |
| 2008/0052145 A1 | 2/2008 | Kaplan et al. |
| 2008/0086411 A1 * | 4/2008 | Olson et al. ..................... 705/39 |
| 2008/0097904 A1 * | 4/2008 | Volchek et al. ................. 705/42 |
| 2008/0155008 A1 | 6/2008 | Stiles et al. |
| 2008/0180027 A1 | 7/2008 | Matsushita et al. |
| 2008/0228613 A1 | 9/2008 | Alexander |
| 2008/0281663 A1 | 11/2008 | Hakim et al. |
| 2008/0312782 A1 | 12/2008 | Berdichevsky et al. |
| 2009/0021213 A1 | 1/2009 | Johnson |
| 2009/0030712 A1 | 1/2009 | Bogolea et al. |
| 2009/0043519 A1 | 2/2009 | Bridges et al. |
| 2009/0066287 A1 | 3/2009 | Pollack et al. |
| 2009/0076913 A1 | 3/2009 | Morgan |
| 2009/0082957 A1 | 3/2009 | Agassi et al. |
| 2009/0091291 A1 | 4/2009 | Woody et al. |
| 2009/0092864 A1 * | 4/2009 | McLean et al. ................. 429/12 |
| 2009/0144001 A1 | 6/2009 | Leonard et al. |
| 2009/0174365 A1 | 7/2009 | Lowenthal et al. |
| 2009/0177580 A1 * | 7/2009 | Lowenthal et al. ............. 705/39 |
| 2009/0192655 A1 | 7/2009 | Ichikawa et al. |
| 2009/0210357 A1 | 8/2009 | Pudar et al. |
| 2009/0287578 A1 * | 11/2009 | Paluszek et al. ................. 705/17 |
| 2009/0312903 A1 | 12/2009 | Hafner et al. |
| 2009/0313032 A1 | 12/2009 | Hafner et al. |
| 2009/0313033 A1 | 12/2009 | Hafner et al. |
| 2009/0313034 A1 | 12/2009 | Ferro et al. |
| 2009/0313098 A1 | 12/2009 | Hafner et al. |
| 2009/0313103 A1 | 12/2009 | Ambrosio et al. |
| 2009/0313104 A1 | 12/2009 | Hafner et al. |
| 2009/0313174 A1 | 12/2009 | Hafner et al. |
| 2010/0017045 A1 | 1/2010 | Nesler et al. |
| 2010/0049396 A1 | 2/2010 | Ferro et al. |
| 2010/0049533 A1 | 2/2010 | Ferro et al. |
| 2010/0049610 A1 | 2/2010 | Ambrosio et al. |
| 2010/0049737 A1 | 2/2010 | Ambrosio et al. |
| 2010/0169008 A1 | 7/2010 | Niwa et al. |
| 2011/0071923 A1 | 3/2011 | Kende et al. |
| 2012/0191524 A1 | 7/2012 | Ambrosio et al. |
| 2012/0221160 A1 | 8/2012 | Hafner et al. |

FOREIGN PATENT DOCUMENTS

| | | |
|---|---|---|
| JP | 2000289355 A | 10/2000 |
| JP | 2001359203 A | 12/2001 |
| JP | 2006262570 A | 9/2006 |
| WO | 03075440 A1 | 9/2003 |
| WO | 2006057889 A2 | 6/2006 |

OTHER PUBLICATIONS

U.S. Appl. No. 12/139,564, filed Jun. 16, 2008, Hafner et al.
U.S. Appl. No. 12/139,565, filed Jun. 16, 2008, Hafner et al.
U.S. Appl. No. 12/139,569, filed Jun. 16, 2008, Ferro et al.
U.S. Appl. No. 12/139,571, filed Jun. 16, 2008, Hafner et al.
U.S. Appl. No. 12/194,245, filed Aug. 19, 2008, Ferro et al.
U.S. Appl. No. 12/194,325, filed Aug. 19, 2008, Ferro et al.
U.S. Appl. No. 12/194,341, filed Aug. 19, 2008, Ambrosio et al.
U.S. Appl. No. 12/194,210, filed Aug. 19, 2008, Ambrosio et al.

(56) References Cited

OTHER PUBLICATIONS

U.S. Appl. No. 12/139,561, filed Jun. 16, 2008, Hafner et al.
U.S. Appl. No. 12/139,574, filed Jun. 16, 2008, Ambrosio et al.
U.S. Appl. No. 12/139,575, filed Jun. 16, 2008, Hafner et al.
Brooks, "State Unveils Plan to Help Drivers Recharge Their Electric Vehicles", Los Angeles Times, Los Angeles CA, Aug. 29, 1998, D1.
Wildman, "Gas-Free Nation", New York Times Magazine, New York, Apr. 20, 2008, p. 69.
USPTO office action for U.S. Appl. No. 12/194,341 dated Mar. 25, 2011.
USPTO final office action for U.S. Appl. No. 12/194,210 dated Mar. 25, 2011.
USPTO notice of allowance for U.S. Appl. No. 12/139,575 dated Mar. 8, 2011.
USPTO office action for U.S. Appl. No. 12/139,575 dated Oct. 8, 2010.
USPTO office action for U.S. Appl. No. 12/194,210 dated Nov. 22, 2010.
USPTO office action for U.S. Appl. No. 12/139,569 dated Apr. 25, 2011.
USPTO office action for U.S. Appl. No. 12/139,565 dated Jun. 1, 2011.
USPTO office action for U.S. Appl. No. 12/139,571 dated Apr. 25, 2011.
Office Action, dated Apr. 23, 2014, regarding U.S. Appl. No. 12/139,571, 84 pages.
Office Action, dated Aug. 5, 2014, regarding U.S. Appl. No. 12/139,571, 48 pages.
Office action dated May 26, 2010 regarding U.S. Appl. No. 12/048,183, 14 pages.
Notice of allowance dated Dec. 10, 2010 regarding U.S. Appl. No. 12/048,183, 10 pages.
Appeal brief dated Aug. 24, 2011 regarding U.S. Appl. No. 12/194,210, 35 pages.
Examiner's answer dated Nov. 2, 2011, regarding U.S. Appl. No. 12/194,210, 21 pages.
Final office action dated Mar. 25, 2011 regarding U.S. Appl. No. 12/194,210, 24 pages.
Reply brief dated Dec. 21, 2011 regarding U.S. Appl. No. 12/194,210, 15 pages.
Final office action, dated May 11, 2012 regarding U.S. Appl. No. 12/194,245, 32 pages.
Office action dated Nov. 18, 2011 regarding U.S. Appl. No. 12/194,245, 40 pages.
Notice of allowance dated Sep. 14, 2011 regarding U.S. Appl. No. 12/194,325, 7 pages.
Office action dated Jun. 20, 2011 regarding U.S. Appl. No. 12/194,325, 25 pages.
Final office action dated Oct. 17, 2011 regarding U.S. Appl. No. 12/194,341, 15 pages.
Office action dated Mar. 25, 2011 regarding U.S. Appl. No. 12/194,341, 21 pages.
Office action dated Aug. 17, 2012 regarding U.S. Appl. No. 13/431,539, 17 pages.
Final office action dated Jan. 16, 2013 regarding U.S. Appl. No. 13/431,539, 11 pages.
Office action dated Jan. 7, 2011 regarding U.S. Appl. No. 12/139,561, 9 pages.
Office action dated Feb. 2, 2012 regarding U.S. Appl. No. 12/139,561, 12 pages.
Office action dated Jul. 11, 2011 regarding U.S. Appl. No. 12/139,561, 15 pages.
Office action dated Oct. 6, 2010 regarding U.S. Appl. No. 12/139,561, 10 pages.
Final office action dated Feb. 7, 2012 regarding U.S. Appl. No. 12/139,562, 47 pages.
International search report dated Jan. 3, 2007 regarding application PCT/US2005/041688, 1 page.
Office action dated Oct. 3, 2011 regarding U.S. Appl. No. 12/139,562, 65 pages.
Office action dated Jan. 5, 2012 regarding U.S. Appl. No. 12/139,564, 26 pages.
Final office action dated Oct. 26, 2011 regarding U.S. Appl. No. 12/139,565, 27 pages.
Office action dated Jun. 1, 2011 regarding U.S. Appl. No. 12/139,565, 31 pages.
Final office action dated Oct. 19, 2011, regarding U.S. Appl. No. 12/139,569, 35 pages.
Office action dated Apr. 25, 2011 regarding U.S. Appl. No. 12/139,569, 43 pages.
Final office action dated Oct. 14, 2011 regarding U.S. Appl. No. 12/139,571, 36 pages.
Office action dated Apr. 25, 2011 regarding U.S. Appl. No. 12/139,571, 45 pages.
Notice of allowance dated Jan. 19, 2012 regarding U.S. Appl. No. 12/139,574, 38 pages.
Notice of allowance, dated Apr. 30, 2012 regarding U.S. Appl. No. 12/139,574, 17 pages.
Notice of allowance dated Mar. 8, 2011 regarding U.S. Appl. No. 12/139,575, 8 pages.
Office action dated Aug. 16, 2005 regarding U.S. Appl. No. 10/992,840, 9 pages.
Notice of allowance dated Dec. 1, 2005 regarding U.S. Appl. No. 10/992,840, 8 pages.
Brooks, "State Unveils Plant to Help Drivers Recharge Their Electric Vehicles," Los Angeles Times, Los Angeles, California, Aug. 29, 1998, 2 pages.
Ackerman, "Hybrid Vehicle Cruises for Battle," SIGNAL Magazine, Apr. 2004, 4 pages, accessed Jan. 9, 2013 http://www.afcea.org/content/?q=node/91.
Boujelelben et al., "Evaluation and optimization of a hybrid urban Microbus," IEEE Conference on Electric and Hybrid Vehicles, Dec. 2006, pp. 1-8.
"All About Plug-In Hybrids (PHEVs)," CalCars, California Car Initiative, Copyright 2012, 4 pages, accessed Jan. 9, 2013 http://www.calcars.org/vehicles.html.
Cikanek et al., "Control System and Dynamic Model Validation for a Parallel Hybrid Electric Vehicle," Proceedings of the 1999 American Control Conference, vol. 2, Jun. 1999, pp. 1222-1227.
De Breucker et al., "Grid Power Quality Improvements Using Grid-Coupled Hybrid Electric Vehicles PEMD 2006," The 3rd IET International Conference on Power Electronics, Machines and Drives, Mar. 2006, pp. 505-509.
Galdi et al., "Multi-Objective Optimization for Fuel Economy and Emissions of HEV Using The Goal-Attainment Method," EVA 18, published 2001, 12 pages.
Gonder et al., "Energy Management Strategies for Plug-In Hybrid Electric Vehicles," 2007 SAE World Congress, Apr. 2007, 13 pages.
Renault, "Kangoo reinvents the electric car," Renault press release, Mar. 2003, 3 pages.
L3 Research, Enigma Hybrid Specifications, L3 Research, Inc., copyright 2003, 1 page, accessed Jan. 9, 2013 http://www.l3research.com/vehicles/enigma/specifications.htm.
Markel et al., "Plug-in Hybrid Electric Vehicle Energy Storage System Design," Advanced Automotive Battery Conference, May 2006, 13 pages.
O'Keefe et al., "Dynamic Programming Applied to Investigate Energy Management Strategies for a Plug-in HEV," 22nd International Battery, Hybrid and Fuel Cell Electric Vehicle Symposium and Exhibit, Oct. 2006, 15 pages.
Piccolo et al., "Fuzzy Logic Based Optimal Power Flow Management in Parallel Hybrid Electric Vehicles," Iranian Journal of Electrical and Computer Engineering, vol. 4, No. 2, Summer-Fall 2005, 11 pages.
"Plug-In Hybrids," hybridcars.com, copyright 2005, 2 pages, accessed Jan. 9, 2013 http://web.archive.org/web/20050310125208/http://www.hybridcars.com.
Powers, "PHEV," About, Inc., copyright 2005, New York Times Company, 1 pages, accessed Jan. 9, 2013 http://web.archive.org/web/20051231074047/http://hybridcars.about.com.

(56) References Cited

OTHER PUBLICATIONS

Short et al., "A Preliminary Assessment of Plug-In Hybrid Electric Vehicles on Wind Energy Markets," Technical Report NREL/TP-620-39729, National Renewable Energy Laboratory, Apr. 2006, 41 pages.
Suppes, "Plug-in Hybrid with Fuel Cell Battery Charger," International Journal of Hydrogen Energy, vol. 30, Issue 2, Feb. 2005, 9 pages.
Zhonghao et al., "Research on Modeling and Simulation of Hybrid Electric Vehicle Energy Control Systems," Proceedings of the Eighth International Conference on Electrical Machines and Systems, vol. 1, Sep. 2005, 4 pages.
Notice of allowance dated Nov. 16, 2012 regarding U.S. Appl. No. 12/139,564, 10 pages.
Final office action dated Jul. 15, 2013, regarding U.S. Appl. No. 12/194,341, 22 pages.
Notice of allowance dated Dec. 27, 2013, regarding U.S. Appl. No. 12/194,341, 8 pages.
Notice of allowance dated May 9, 2014, regarding U.S. Appl. No. 13/431,539, 24 pages.
Notice of allowance dated Mar. 14, 2013, regarding U.S. Appl. No. 12/139,561, 8 pages.
Office Action dated Jul. 2, 2014, regarding U.S. Appl. No. 12/139,562, 110 pages.
Notice of allowance dated May 6, 2013, regarding U.S. Appl. No. 12/139,564, 8 pages.
Office action dated Mar. 18, 2013, regarding U.S. Appl. No. 12/139,564, 28 pages.
Final office action dated Apr. 23, 2014, regarding U.S. Appl. No. 12/139,565, 13 pages.
Office action dated Mar. 20, 2014, regarding U.S. Appl. No. 12/139,565, 39 pages.
Office Action dated Aug. 7, 2014, regarding U.S. Appl. No. 12/139,569, 54 pages.
Office Action dated Apr. 24, 2014, regarding U.S. Appl. No. 12/139,569, 80 pages.

\* cited by examiner

ENERGY TRANSACTION BROKER FOR BROKERING ELECTRIC VEHICLE CHARGING TRANSACTIONS

BACKGROUND OF THE INVENTION

1. Field of the Invention

The present invention is related generally to an improved data processing system, and in particular, to a method and apparatus for managing electric vehicle charging transactions. More particularly, the present invention is directed to a computer implemented method, apparatus, and computer usable program code for brokering a charging process of an electric vehicle.

2. Description of the Related Art

Electric vehicles (EV) can be divided into two categories: totally electric vehicles (TEV) and plug-in hybrid electric vehicles (PHEV). Plug-in hybrid vehicles utilize two or more power sources to drive the vehicle. With the increasing costs of fossil fuels and concern over reliance on non-renewable resources, electric vehicles are poised to become a critical component of transportation systems throughout the world. Gasoline powered vehicles utilize the explosive power of a mixture of gasoline and air to propel the vehicle. In contrast, electric vehicles rely in whole or in part on electric power to drive the vehicle.

Electric vehicles contain electric storage mechanisms, such as batteries, to store electricity until it is needed to power the electric vehicle. The electric storage mechanisms require periodic charging to replenish the electric charge for continued operation. The electricity used to charge the electric storage mechanisms may be provided by any type of on-vehicle power generation and charging mechanism. The on-vehicle power generation and charging mechanisms may include consumptive power generation systems and/or non-consumptive power generation systems, such as, without limitation, fuel cells, gasoline powered combustion engines, biodiesel powered engines, solar powered generators, and regenerative braking systems.

In totally electric vehicles and plug-in hybrid electric vehicles, charging of the electric vehicles can also be accomplished by plugging the electric vehicle into an off-vehicle charging station. The off-vehicle charging station provides an external source of electricity, such as, an electric power grid. Totally electric vehicles require this type of off-vehicle charging in all cases. Off-vehicle charging is also likely to be significantly less expensive for plug-in hybrid electric vehicles than on-vehicle charging given currently available technology. Consequently, off-vehicle charging may be the preferred charging mode for electric vehicle owners.

The power stored in the electric storage mechanisms on the electric vehicles and on-vehicle power generation mechanisms may be used to provide electricity back to the electricity grid. For electric vehicles to be used as suppliers of electric power to an electric power grid, electric vehicles are connected to an off-vehicle infrastructure, which can efficiently consume the electricity generated or stored by the electric vehicle. To date, electric vehicle manufacturers and electric utility companies have only planned and provided infrastructure and methods for the most rudimentary charging scenario in which the electric vehicle is plugged into a common electric outlet.

BRIEF SUMMARY OF THE INVENTION

According to one embodiment, a computer implemented method, apparatus, and computer usable program code is provided for brokering a charging process of an electric vehicle. In one embodiment, a process extracts event data associated with the charging process from a charge notification in response to receiving the charge notification indicating that the charging process of the electric vehicle is complete. The event data comprises a duration of the charging process. The process then identifies, from an energy transaction plan, a set of payees participating in the charging process. Thereafter, the process disburses a payment owed to the set of payees. An amount of the payment is calculated using payment terms in profiles of the set of payees. The payment includes funds from at least one of a payer fund and an incentive fund.

DETAILED DESCRIPTION OF THE INVENTION

Figure 1:
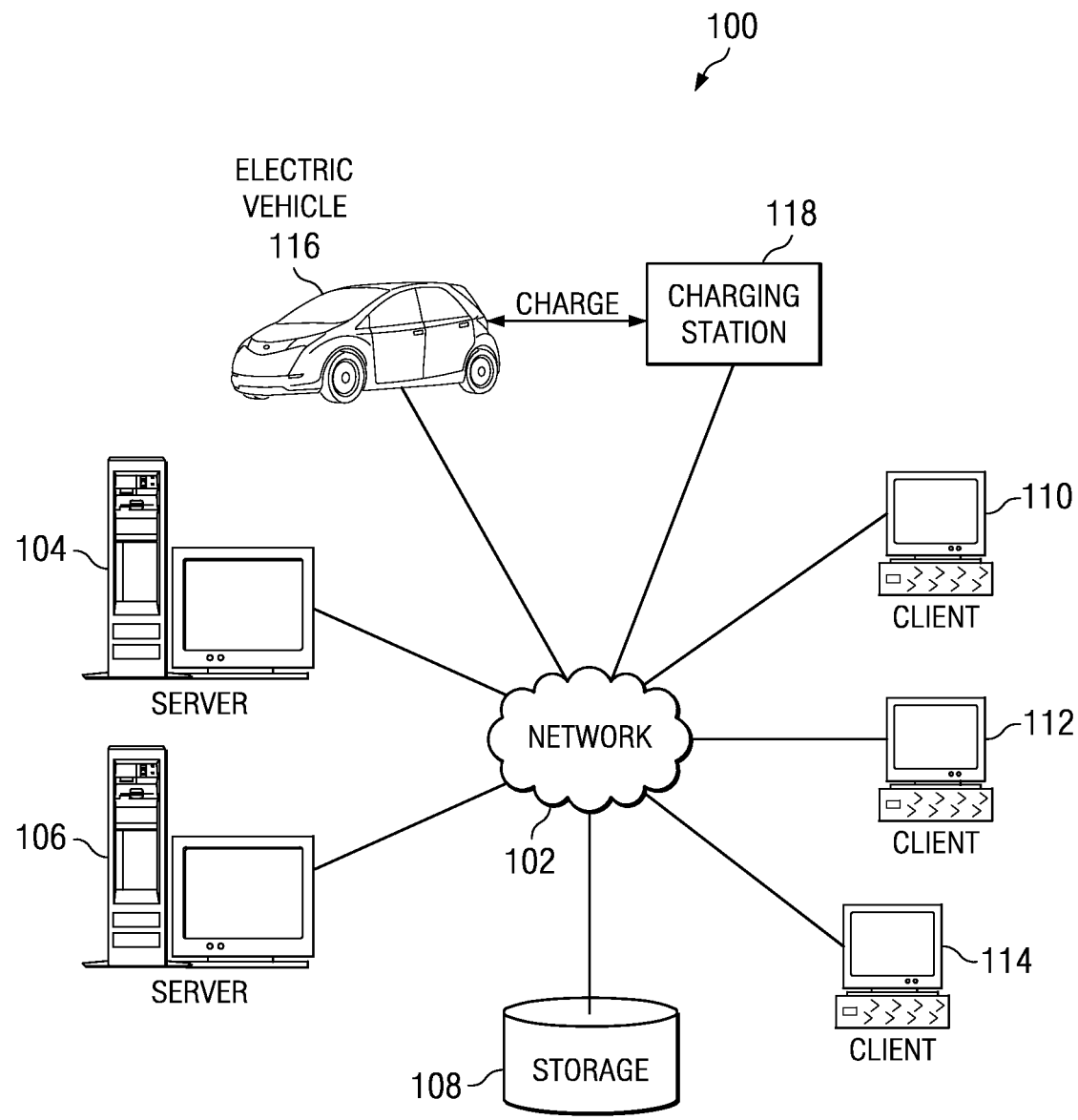
FIG. 1 is a pictorial representation of a network of data processing system in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media, such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language, such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
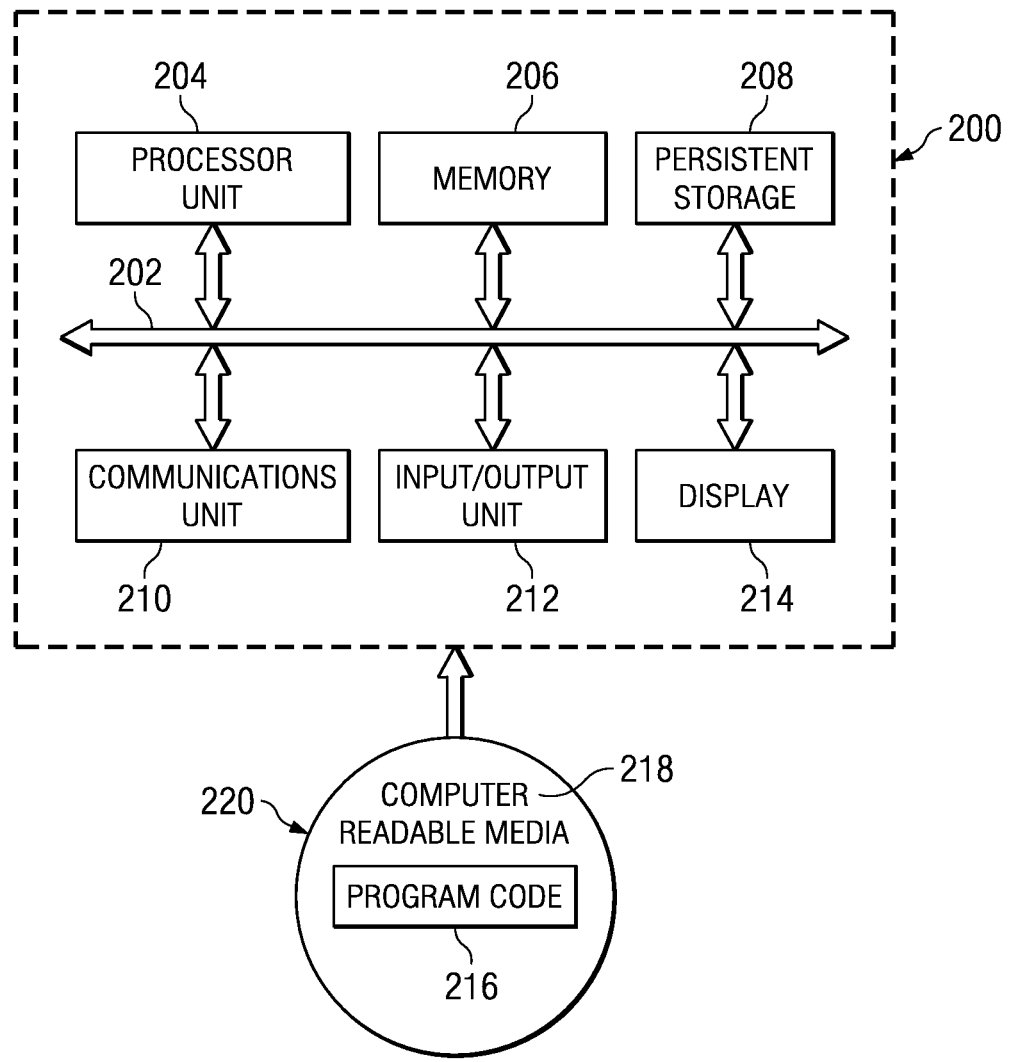
FIG. 2 is a block diagram of a data processing system in which illustrative embodiments may be implemented.

With reference now to the figures, and in particular, with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing system in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Electric vehicle 116 is any vehicle that utilizes electric power in whole or in part to drive the vehicle that is capable of being plugged into charging station 118. Electric vehicle 116 may be a totally electric vehicle or a plug-in hybrid electric vehicle. The plug-in electric hybrid vehicle may be a gasoline/electric hybrid, a natural gas/electric hybrid, a diesel/electric hybrid, a biodiesel/electric hybrid, or any other type of plug-in electric hybrid. Electric vehicle 116 may optionally include an on-vehicle power generation mechanism, such as, but without limitation, solar power electric generators, gasoline powered electric generators, biodiesel powered electric generator, or any other type of on-vehicle electric power generation mechanism.

Charging station 118 is any station, kiosk, garage, power outlet, or other facility for providing electricity to electric vehicle 116. Electric vehicle 116 receives electricity from, or provides electricity to, an electric grid at charging station 118. Charging station 118 is a selected charge/discharge site, such as an outlet or kiosk, for providing electric vehicle 116 with access to the electric grid. For example, and without limitation, charging station 118 may be a power outlet in a privately owned garage, an electric outlet in a docking station in a commercially owned electric vehicle charging kiosk, or a power outlet in a commercially owned garage.

Electric vehicle 116 connects to charging station 118 via an electrical outlet or other electricity transfer mechanism. The electricity may also be optionally transferred via wireless energy transfer, also referred to as wireless power transfer, in which electrical energy is transferred to a load, such as electric vehicle 116, without interconnecting wires. The electricity may flow from charging station 118 into electric vehicle 116 to charge electric vehicle 116. The electricity may also flow from electric vehicle 116 into charging station 118 to sell electricity back to the power grid.

Electric vehicle 116 and charging station 118 are optionally connected to network 102. Electric vehicle 116 and charging station 118 send and receive data associated with the charging of electric vehicle, the capabilities of electric vehicle, the capabilities of charging station 118, the current charge stored in electric vehicle, the rate of charging electric vehicle, the price of electricity received from a power grid, identity of the owner and/or operator of electric vehicle 116 and/or any other data relevant to charging or de-charging electric vehicle 116 over network 102.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. Data processing system 200 may also be implemented as a computing device on-board an electric vehicle, such as electric vehicle 116 in FIG. 1.

In this illustrative example, data processing system 200 includes communications fabric 202, which provides communications between processor unit 204, memory 206, persistent storage 208, communications unit 210, input/output (I/O) unit 212, and display 214. Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. In another example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub that may be present in communications fabric 202.

Currently, electric vehicle manufacturers and electric utility companies have only planned and provided infrastructure for the most rudimentary charging scenarios, such as, merely plugging the electric vehicle into a common electric outlet that is owned by the owner and operator of the electric vehicle. The illustrative embodiments recognize that charging electric vehicles will frequently be conducted under much broader and more complex sets of circumstances than this simple scenario and infrastructure is needed to accommodate these complex transactions. For example, owners and operators of electric vehicles will frequently be required to charge their electric vehicle at a charging station that is remote from the home of the electric vehicle owner. In most circumstances, it is unlikely that the electric vehicle owner will own the off-vehicle charging stations from which the owner obtains electricity to recharge the electric vehicle. In such a situation, the owner or operator of the electric vehicle will likely be required to pay for the charge obtained from the off-vehicle charging station.

The illustrative embodiments recognize that the charging transactions by which electric vehicles obtain electricity from an off-vehicle charging station to charge the electric vehicle requires a much more complete, flexible, and interoperable system governing all aspects of the charging transaction. Electric vehicle charging transactions can be divided into the pre-charge phase, the charge phase, and the post-charge phase. During the pre-charge phase of decision enablement, all parties are presented with the conditions governing the charging transaction. Electricity flows to the electric vehicle and payment is made during the post-charge phase. Finally, during the post-charge phase of the transaction, an analysis is performed to provide incentives and induce specific behaviors on the part of any party involved in the transaction. Additional charging infrastructure may also be provided to meter electricity at the point of charge, identify the various parties involved in the transaction, and provide flexible business rules governing the flow of funds between those parties.

Figure 3:
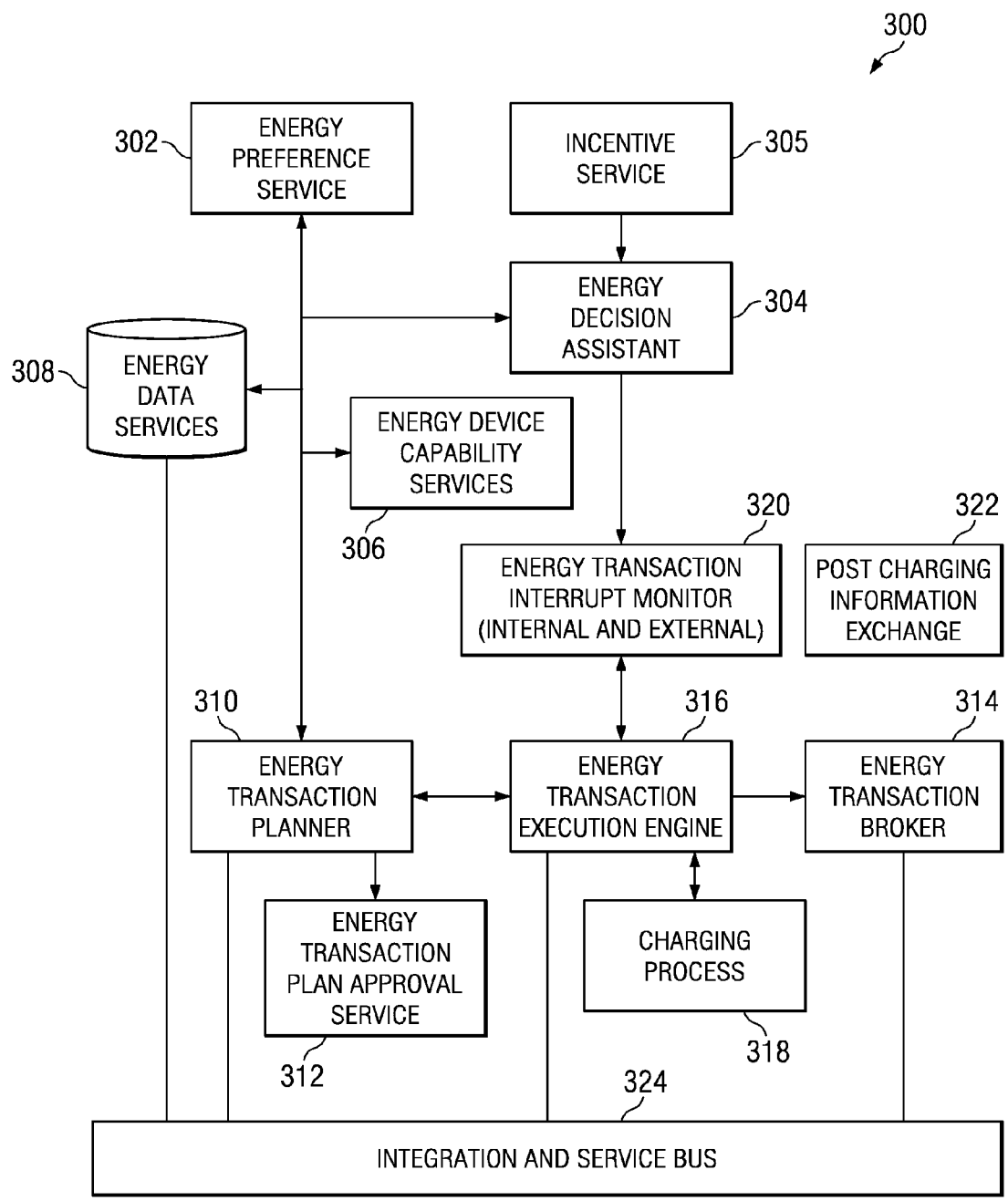
FIG. 3 is a block diagram of an energy transaction infrastructure in accordance with an illustrative embodiment.

FIG. 3 is a block diagram of an energy transaction infrastructure in accordance with an illustrative embodiment. Electric vehicle energy transaction infrastructure 300 is a charging infrastructure for managing all phases of an electric vehicle charging transaction. The components of electric vehicle energy transaction vehicle charging infrastructure 300 include components that may be found in a network data processing system, such as network data processing system 100 in FIG. 1. For example, preference services or data services of electric vehicle energy transaction vehicle charging infrastructure 300 may be hosted in a server, such server 104 in FIG. 1.

During the pre-charge phase, all parties of the transaction are presented with the conditions governing the charging transaction. The parties may include, without limitation, the owner of the electric vehicle to be charged, the operator of the electric vehicle, the owner of the charging station, and an electric utility company providing electricity to an electric power grid associated with the charging station. Parties agree to conditions relevant to their role in the transaction prior to the charge commencing. There are likely to be many special circumstances in the terms and conditions, which are presented in standard formats which are universally understood and which can be readily communicated and agreed upon by all parties.

During the pre-charge phase, electric vehicle energy transaction infrastructure 300 utilizes energy preference service 302, energy decision assistant 304, energy device capability services 306, energy data services 308, energy transaction planner 310, and optionally, energy transaction plan approval service 312 to generate a plan governing the charging transaction to the parties involved in the transaction.

Energy preference service 302 is a software component that generates, stores, and retrieves preference information associated with an electric vehicle and the preference information associated with the parties to the transaction. Preferences may include, without limitation, a maximum price per kilowatt hour of electricity to be paid by a party, a location where charging may occur, a location where charging may not occur, a rate of charging the electric vehicle, a minimum amount of charge, or any other preferences associated with charging an electric vehicle. The preferences may be pre-generated by one or more of the parties to the transaction.

Energy decision assistant 304 is an optional service that provides real-time options and trade-offs for a particular trip. For example, energy decision assistant 304 may monitor available incentives, weather conditions, a travel route, traffic information, and other real-time data to identify the best electric vehicle charging options for a particular trip.

Incentive service 305 receives offers of incentives from third party vendors. The incentives may be offers of discounts, rebates, rewards, and/or other incentives associated with charging an electric vehicle to encourage an operator of the electric vehicle to perform one or more behaviors associated with charging the electric vehicle. For example, and without limitation, an incentive may offer to charge the electric vehicle for free at a particular charging station if the owner or operator of the electric vehicle purchases one or more products from the third party vendor. Incentive service 305 provides information describing current incentives to energy transaction planner 310. In one embodiment, incentive service 305 provides the information describing the incentives to energy decision assistant 304. Energy decision assistant 304 then provides the incentives information to energy transaction planner 310.

Energy device capability services 306 is a software component that identifies and validates device capabilities. For example, and without limitation, energy device capability services 306 may include information describing the charging capabilities of the charging station, the charging requirements of the electric vehicle, the maximum storage capacity of the electric vehicle on-vehicle storage mechanisms, the existing amount of charge in the electric vehicle, the number of amps of electricity the charging station is capable of providing, and any other information associated with the capabilities and requirements of the electric vehicles and the charging station.

Energy data services 308 are a set of one or more third party data sources providing information relevant to the energy transaction. Energy data services 308 may include, without limitation, weather information sources, traffic information sources, map and travel information sources, charging station price information sources, or any other third party information sources.

Energy transaction planner 310 is an application that creates a transaction plan for governing the electric vehicle charging transaction based on preferences of one or more principals. Energy transaction plan approval service 312 approves the transaction plan and validates with energy transaction broker 314. Energy transaction plan approval service 312 may be required to notify one or more parties of the terms of the transaction and obtain approval of one or more of the terms from the party. For example, and without limitation, if an operator of the electric vehicle is not the owner of the electric vehicle, energy transaction plan approval service 312 may require approval from the owner of the vehicle before allowing the vehicle to receive power at a charging station if the charging station and/or a utility will charge the owner of the electric vehicle a fee for the charging transaction.

In this example, the charging phase begins when energy transaction execution engine 316 sends the transaction plan generated by energy transaction planner 310 for approval by energy transaction plan approval service 312. Thereafter, the energy transaction execution engine 316 initiates charging process 318 for charging the electric vehicle. Charging process 318 is a series of related events or conditions in an exchange of electricity between the electric vehicle and charging station. The activities of charging process 318 may include, for example, identification of parties and preferences, the authenticating data, storing data, analyzing data, or any other event or condition that is directly related to or incidental to the exchange of electricity. In the simplest form, charging process 318 involves a flow of electricity into the electric vehicle from the power grid or out of the electric vehicle and back into the power grid. Energy transaction execution engine 316 then monitors and logs the health and safety of charging process 318, and receives interrupt notifications from energy transaction interrupt monitor 320.

Energy transaction interrupt monitor 320 monitors data transmissions and conditions that result from the execution of charging process 318 to detect interrupt conditions that may terminate the flow of electric power to or from a vehicle. The interrupts may originate from the power grid, suppliers, and/or vehicles. For example, if a price of energy exceeds a predefined threshold in violation of a user-selected preference, energy transaction interrupt monitor 320 detects this interrupt condition and initiates appropriate actions to handle the cessation of electric power flow to the electric vehicle.

Energy transaction broker 314 supports settling an electric vehicle charging and discharge transaction independent of electricity supplier, parking space supplier, electrical infrastructure supplier, taxing authority, incentive provider, or other interested party. Elements include pricing schedules, time based pricing, facility recovery, tax collection, incentives, and/or fixed plans. Energy transaction broker 314 may also be used by energy transaction approval service 312 to validate the financial elements of the energy transaction plan prior to plan approval and prior to charging the electric vehicle.

The post-charge phase comprises analysis of the completed energy transaction to provide incentives, redeem credits or benefits, and induce specific behaviors by one or more parties involved in the charging transaction. The post-charge phase also includes payment of the appropriate parties for the energy transaction in accordance with the energy transaction plan governing the transaction. Various programs may be available to incent specific behaviors on the part of consumers. For example, a vehicle owner or user may receive reduced electricity rates if vehicle charging is conducted during off-peak times, such as during the night rather than during daylight hours when electricity usage is higher. Post charging information exchange 322 accumulates data pertinent to these incentives or redemption programs, authenticates the incentives data, and analyzes the incentives data to identify the most effective business process and optimize incentives for the parties.

Operational and financial parameters are conveyed for an optimum charge to occur. For example, a dynamic representation of an electric vehicle capability to consume charge should be understood at all times during the charging process to ensure the vehicle is not damaged or that the protections of the charging system are preserved. Electricity metering of the power flow may also be conducted and reported. Standards representing the acceptable charging voltage and amperage ranges, for example may be communicated and maintained for a safe charging transaction to occur. All data pertinent to the financial transaction is conveyed and recorded.

The components shown in FIG. 3 may be implemented on a data processing system associated with an electric vehicle. In such case, the components communicate and transfer data using integration and service bus 324. Integration and service bus 324 is an internal communication system within the electric vehicle, such as any wired or wireless communications system. A wired communications system includes, without limitation, a data bus or a universal serial bus (USB). If one or more components shown in FIG. 3 are located remotely, the components may transfer data using any type of wired or wireless network connection to connect to a network, such as network 102 in FIG. 1. A wireless network connection may be implemented over a cell-phone network, satellite, two-way radio, WiFi networks, or any other type of wireless network.

An energy transaction plan providing details of a charging transaction of an electric vehicle at a charging station may be used for brokering the settlement of the charging transaction. An energy transaction execution engine may provide the energy transaction plan to an energy transaction broker after a charging transaction has completed. Referencing the energy transaction plan, the energy transaction broker may execute the steps of a process for brokering the settlement of the charging process. The steps may include, for example, identification of parties to the charging process, calculation of an amount of payment due to a set of payees, identification of sources of payment, and allocation of the payment to the set of payees. The settlement process may also require applying incentive funds to offset an amount owed by the party charging an electric vehicle.

Thus, in accordance with one embodiment, a computer implemented method, apparatus, and computer usable program code is provided for brokering a charging process of an electric vehicle. In one embodiment, a process extracts event data associated with the charging process from a charge notification in response to receiving the charge notification indicating that the charging process of the electric vehicle is complete. The event data may include, but is not limited to, duration of the charging process, quantity of electricity transferred, or rate at which electricity was transferred during the charging process. The process then identifies, from an energy transaction plan, a set of payees participating in the charging process. Thereafter, the process disburses a payment owed to the set of payees. An amount of the payment is calculated using payment terms in profiles of the set of payees. The payment includes funds from at least one of a payer fund and an incentive fund. As used herein the phrase "at least one of" when used with a list of items means that different combinations one or more of the items may be used and only one of each item in the list may be needed. For example, "at least one of item A, item B, and item C" may include, for example, without limitation, item A or item A and item B. This example also may include item A, item B, and item C or item B and item C. Thus, the payment may include funds from a payer fund, an incentive fund, or both.

Figure 4:
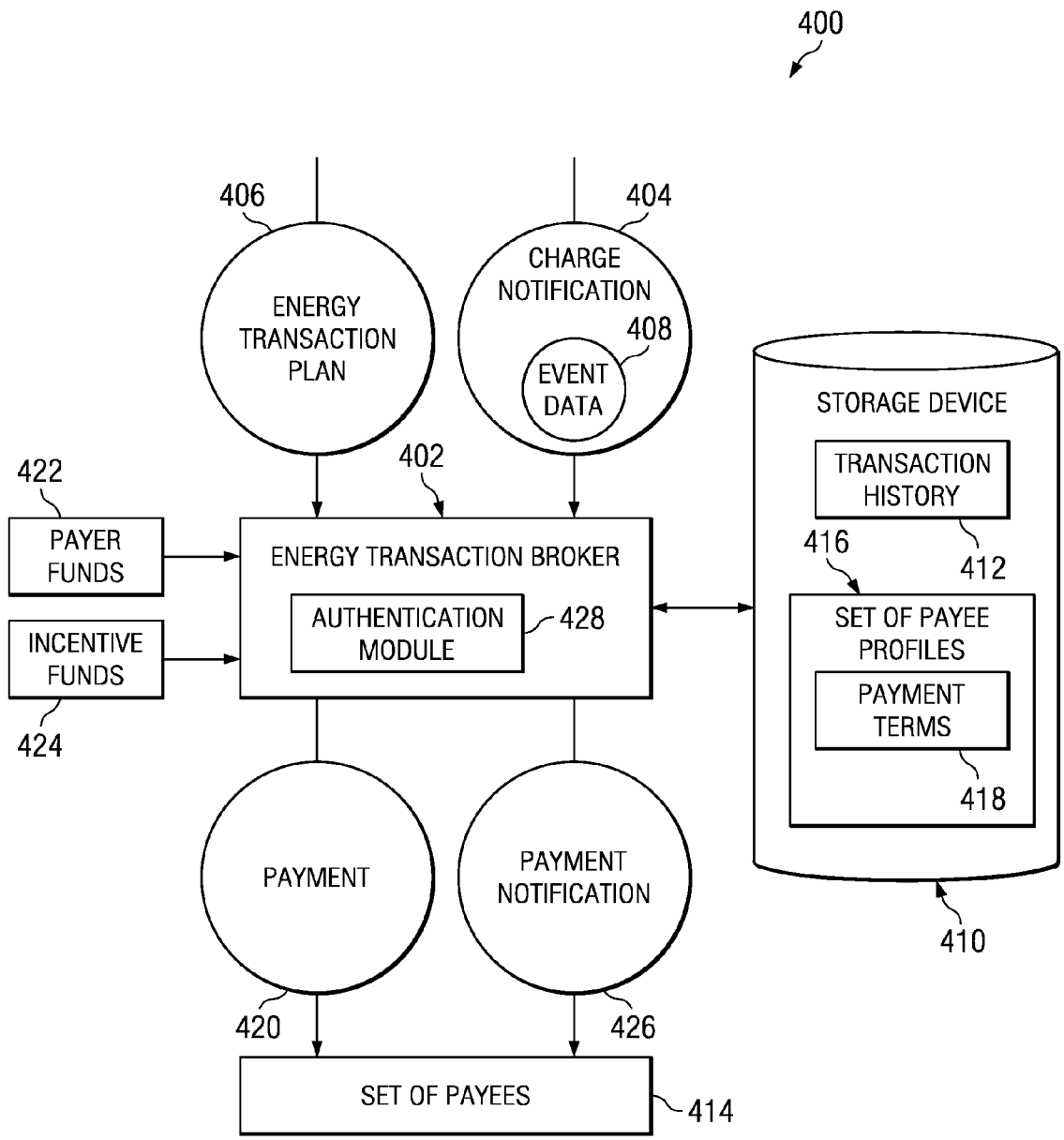
FIG. 4 is a block diagram of a data processing system for brokering a charging process of an electric vehicle in accordance with an illustrative embodiment.

FIG. 4 is a block diagram of a data processing system for brokering a charging process of an electric vehicle in accordance with an illustrative embodiment. System 400 is a system for processing data, such as network data processing system 100 in FIG. 1 and electric vehicle energy transaction infrastructure 300 in FIG. 3.

System 400 includes energy transaction broker 402. Energy transaction broker 402 is an energy transaction broker, such as energy transaction broker 314 in FIG. 3. Energy transaction broker 402 is configured for brokering settlement of a charging process of an electric vehicle. The charging process is a charging process, such as charging process 318 in FIG. 3. The charging process proceeds in accordance with an energy transaction plan, such as energy transaction plan 406. Energy transaction plan 406 is a set of terms governing the charging process of an electric vehicle at a charging station. The terms of energy transaction plan 406 may include, for example, a preferred method of payment for a party entitled to payment, a financial institution from which funds may be made available, dates upon which payment are made, utility providers from which electricity may be purchased, the price per kilowatt hour rate at which electricity is available to be purchased, or any other term that may apply to a charging process or to transactions incidental to the charging process. The terms of energy transaction plan 406 are agreed to by the parties to the charging process, such as an owner/operator of an electric vehicle, a utility provider, a governmental regulatory entity, or any other third party participant or vendor. Energy transaction plan 406 may be generated by an energy transaction planner, such as energy transaction planner 310 in FIG. 3. An illustrative energy transaction plan is discussed in more detail in FIG. 5.

An energy transaction execution engine, such as energy transaction execution engine 316 in FIG. 3 executes a charging process according to energy transaction plan 406. The energy transaction execution engine initiates a charging process and terminates the charging process when the charging process is completed. The charging process may be completed if the electric vehicle is fully charged, or charged in accordance with energy transaction plan 406. In addition, the charging process may be terminated if the charging process deviates from the terms of energy transaction plan 406.

Energy transaction plan 406 is forwarded to energy transaction broker 402 for use in brokering the settlement of the charging process. Energy transaction plan 406 may be forwarded to energy transaction broker 402 by an energy transaction execution engine, an energy transaction interrupt monitor, or other component of an energy transaction infrastructure. Energy transaction plan 406 may be forwarded to energy transaction broker 402 either before or after the termination of the charging process. In another embodiment, energy transaction broker 402 may retrieve energy transaction plan 406 from a centralized storage location when the charging process is initiated or upon completion of the charging process.

Energy transaction broker 402 initiates the settlement process in response to receiving charge notification 404. Charge notification 404 is a message indicating that a charging process has been completed. In an embodiment, where energy transaction plan 406 is stored in a centralized storage location and retrieved by energy transaction broker 402, charge notification 404 may include a unique identifier for locating energy transaction plan 406. Energy transaction broker 402 may receive charge notification 404 from an energy transaction execution engine, such as energy transaction execution engine 316 in FIG. 3.

Charge notification 404 may include event data 408. Event data 408 is data generated during a charging process. Event data 408 may include, for example, data describing a time of the charging process, a quantity of electricity transferred, or a rate at which electricity was transferred during the charging process. The process then identifies, from an energy transaction plan, a set of payees participating in the charging process. Event data 408 is used for brokering the settlement of a charging transaction. For example, event data 408 may include information describing the date on which a charging process completed, an amount of charge that was delivered to an electric vehicle, a cost of electricity, an overall cost of the charging process, errors that may have been encountered, an identity of the electric vehicle operator who initiated the charging process, an owner of the electric vehicle, or any other data derived from or incidental to the charging process. Event data 408 may also indicate, for example, the location of the charging station, the date of the charging transaction, a length of time that the electric vehicle was at the charging station, the variable rate of the cost of electricity during the charging transaction, and the utility provider responsible for providing electricity.

In response to receiving charge notification 404, energy transaction broker 402 extracts event data 408 from charge notification 404. Event data 408 may be stored in storage device 410 and aggregated over time. Storage device 410 is a device for storing data. Storage device 410 may include, for example, a hard drive, flash drive, remote server, or any other device for storing data. Aggregated event data 408 forms transaction history 412. Transaction history 412 is a collection of event data over time. Transaction history 412 may be used for auditing past charging transactions, or mined for relevant information for performing data analysis. The results of the data analysis may be used to provide incentives, recommendations for optimizing energy consumption, or other selected outcomes or tasks. For example, an analysis of a transaction history may permit a government entity to perform an audit of selected electric vehicle users. Alternatively, an owner of a set of charging stations may identify from transaction history 412 a charging station that receives less patronage. The owner may then offer incentives to prospective users increase revenue at poorly performing charging stations.

Event data 408 extracted from energy transaction plan 406 may be used in conjunction with energy transaction plan 406 to identify set of payees 414. Set of payees 414 is one or more entities participating in the charging transaction. Set of payees may include, for example, a utility company, a point of service entity providing a charging station, a government entity specifying a tax applicable to a charging transaction, or any other party participating in a charging transaction. Set of payees 414 may be identified from event data 408 by correlating a unique identifier from charge notification 404 with a set of unique identifiers of included in energy transaction plan 406. Each profile from set of payee profiles 416 corresponds to each unique identifier of energy transaction plan 406.

Set of payee profiles 416 is one or more profiles corresponding to set of payees 414. Each profile from set of payee profiles 416 includes information relating to unique payees from set of payees 414. Thus, set of payees 414 may be identified by energy transaction broker 402 by correlating payee identifiers from charge notification 404 and energy transaction plan 406. Information specific to each payee is stored in set of payee profiles 416. In this manner, energy transaction broker 402 may quickly and easily locate information, instructions, or preferences that facilitate the settlement of a charging transaction for the benefit of each payee in set of payees 414.

For example, information stored in set of payee profiles 416 may include payment terms 418. Payment terms 418 are terms specified by a payee, which govern the settlement of a charging process. For example, payment terms 418 may provide an algorithm for calculating the portion of payment 420 due to the payee, establish the time and manner in which payment 420 is made, or an account into which payment 420 is deposited. Thus, if a payee is a government entity, payment terms 418 may specify that payment 420 is based on a rate of an excise tax applicable to all charging transactions.

Payment 420 is any circulating medium of exchange. For example, payment 420 may include coins, paper money, demand deposits, credit, or other forms of money. Funds from which payment 420 may be paid include at least one of payer funds 422 and incentive funds 424. Thus, payment 420 may be paid with funds from either payer funds 422, incentive funds 424, or a combination of both. Payer funds 422 is a fund supplied by a user of an electric vehicle, who has executed a charge of that electric vehicle. Payer funds 422 may be, for example, credit from a bank account specified by the user from which payment 420 may be automatically withdrawn when payment 420 accrues. In addition, payer funds 422 may be provided by the user in response to receiving a bill for charging transactions that have accrued. Thus, payer funds 422 may be a check, money order, or some other acceptable form of payment.

Payment 420 may also include money originating from incentive funds 424. Incentive funds 424 is a fund established by a party other than the payer. Thus, incentive funds 424 may be established by one or more payees from set of payees 414. In addition, incentive funds 424 may be established by some other third party entity. For example, set of payees 414 may include a point of service entity providing a charging station at which a charging transaction may occur. To entice users to bring an electric vehicle to the charging station owned by the point of service entity, the point of service entity may offer to pay a certain percent of the price of the charging transaction. Consequently, the point of service entity may establish an account from which incentive funds 424 may be taken. Incentive funds 424 are applied to payment 420 and reduce the amount of money that energy transaction broker 402 uses from payer funds 422. Incentive funds 424 may also be established by an entity that is not directly involved in the charging process. For example, a vehicle manufacturer may offer to pay a percentage of payment 420 for purchasers of selected electric vehicles.

After payment 420 is made to set of payees 414, energy transaction broker 402 sends payment notification 426 to set of payees. Payment notification 426 is a message informing set of payees 414 that payment 420 has been disbursed, thus signaling the completion of a charging transaction. Payment notification 426 may provide details, such as, for example, a time at which the disbursement was made, the account into which payment 420 was deposited, a unique identifier associated with the user from which payer funds 422 is associated, the amount of the disbursement, or any other relevant information.

Energy transaction broker 402 may include authentication module 428. Authentication module 428 is a software component for authenticating energy transaction plan 406. Authentication module 428 may implement currently available or later developed authentication algorithms. Authentication module 428 may also implement encryption technologies for protecting energy transaction plan 406 or other forms of protected data. Authentication module 428 insures that only those entities having the proper authorization receive payment 420, payment notification 426, or other forms of protected information.

In an illustrative embodiment, energy transaction broker 402 receives charge notification 404 from an energy transaction execution engine, which signals energy transaction broker 402 that a charging transaction for an electric vehicle has completed. The electric vehicle is an electric vehicle, such as electric vehicle 116 in FIG. 1. Thereafter, energy transaction broker 402 receives energy transaction plan 406 from an energy transaction execution engine or retrieves energy transaction plan 406 from a storage device.

Energy transaction broker 402 extracts event data 408 from charge notification 404. Energy transaction broker 402 then identifies set of payees 414 by correlating unique payee identifiers from event data 408 with energy transaction plan 406. Once set of payees 414 has been identified, energy transaction broker 402 may locate set of payee profiles 416 from storage device 410. Energy transaction broker 402 may use the information in set of payee profiles 416 for calculating an amount owed to each payee of set of payees 414. For example, energy transaction broker 402 may reference payment algorithms defined in payment terms 418 to calculate an amount of payment 420 that is owed to each payee from set of payees 414. In addition, payment terms 418 may specify the manner in which set of payees 414 shall receive payment 420. For example, payment terms 418 may specify the day and time in which the payment 420 should be made, an account into which payment 420 should be deposited, a preferred method of payment, or any other condition for disbursing payment 420.

After energy transaction broker 402 has calculated an amount of payment 420 owed to each payee of set of payees 414, energy transaction broker 402 determines whether an incentives fund exist for satisfying payment 420. If incentives funds exist, then energy transaction broker 402 may satisfy a portion of payment 420 using funds from incentive funds 424. The remainder is withdrawn from payer funds 422. Thereafter, payment 420 is sent to set of payees 414. Thereafter, energy transaction broker 402 sends payment notification 426 to set of payees 414. Payment notification 426 informs set of payees 414 that the transfer of payment 420 is complete.

In addition, energy transaction broker 402 stores event data 408 from energy transaction plan 406 in storage device 410 as transaction history 412. Transaction history 412 may be referenced by energy transaction broker 402 or some other component of the electric vehicle energy transaction infrastructure for auditing past charging transactions or performing data analysis.

Energy transaction broker 402 may authenticate communications and/or the data transmitted between the components of an energy transaction infrastructure. For example, energy transaction broker 402 may use authentication module 428 to authenticate energy transaction plan 406 at some time prior to disbursing payment 420 to set of payees 414. Authentication module 428 includes currently existing or later developed authentication mechanisms for validating energy transaction plan 406 and/or the set of payees 414. Further, authentication module 428 may confirm that the calculation of payment 420 is correct.

Figure 5:
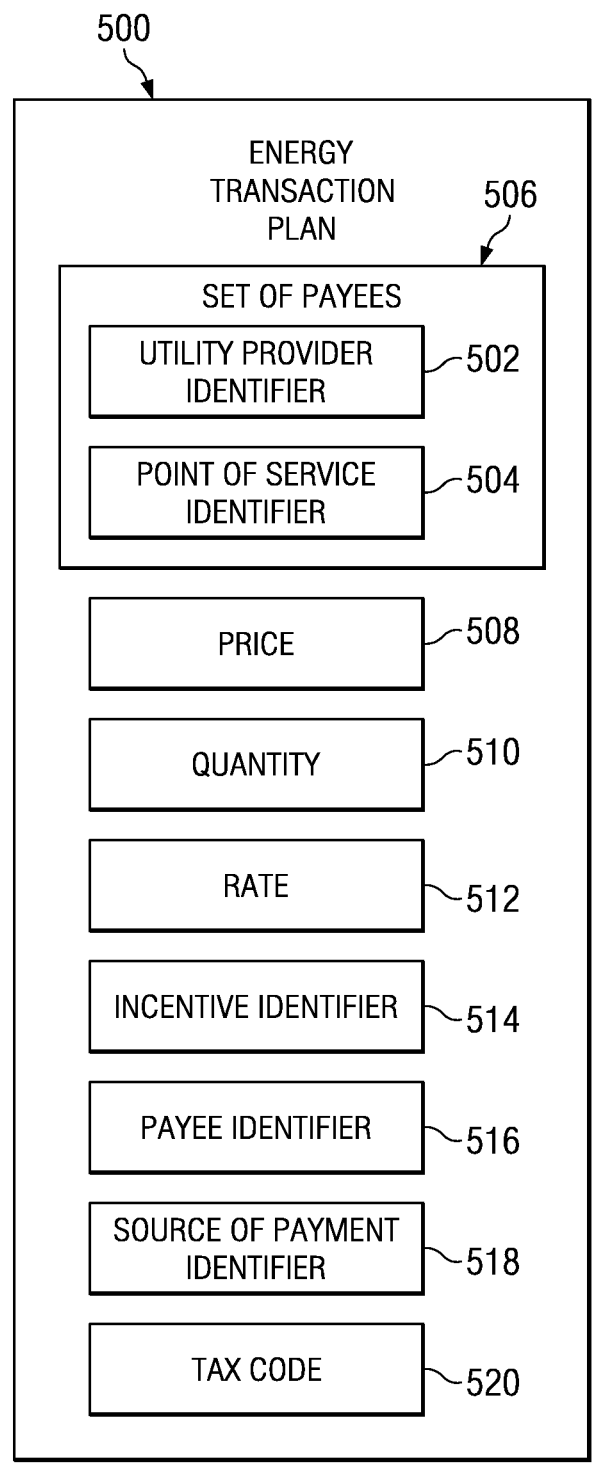
FIG. 5 is a block diagram of an energy transaction plan in accordance with an illustrative embodiment.

FIG. 5 is a block diagram of an energy transaction plan in accordance with an illustrative embodiment. Energy transaction plan 500 is an energy transaction plan, such as energy transaction plan 406 in FIG. 4.

Energy transaction plan 500 includes data usable by an energy transaction broker, such as energy transaction broker 402 in FIG. 4, for calculating a payment owed to a set of payees. Energy transaction plan 500 includes utility provider identifier 502. Utility provider identifier 502 is a unique identifier assigned to a utility provider from which electricity was received.

Energy transaction plan 500 also includes point of service identifier 504. Point of service identifier 504 is a unique identifier assigned to a point of service provider participating in a charging transaction. A point of service provider is an entity providing a charging station at which a charging transaction is allowed to occur.

The entities associated with utility provider identifier 502 and point of service identifier 504 are entities to which payment is owed. Consequently, those entities may form set of payees 506. Set of payees 506 are a set of payees, such as set of payees 414 in FIG. 4.

Price 508 is a total cost of electricity owed as a result of a charging transaction. Price 508 may be calculated based upon quantity 510 and rate 512. Quantity 510 is an amount of electricity that was transferred during a charging transaction. Quantity 510 may be specified in kilowatt-hours. Rate 512 is a per unit cost of electricity. For example, rate may specify a cost of electricity per kilowatt-hour.

Incentive identifier 514 is a set of one or more unique identifiers associated with an incentive fund applicable to the charging transaction described by energy transaction plan 500. An energy transaction broker, such as energy transaction broker 402 in FIG. 4 may reference incentive identifier for location an incentive fund for use in satisfying a payment owed to a set of payees. The incentive fund is an incentive fund, such as incentive funds 424 in FIG. 4. The incentive fund may offset the amount of payment owed to set of payees 506 by a user of identified by payee identifier 516.

Payee identifier 516 is a unique identifier for identifying the user of an electric vehicle from whom payment is owed for a charging transaction. Source of payment identifier 518 is an identifier associated with the source from which a payment, such as payment 420 in FIG. 4 may be made. The source may be, for example, payer funds 422 and/or incentive funds 424 in FIG. 4.

Tax code 520 is one or more codes for identifying any applicable taxes that may be applied to a charging transaction. For example, tax code 520 may specify an applicable sales or excise tax applicable to a charging transaction. Tax code 520 may be specified by a city, state, or federal tax law.

Energy transaction plan 500 may be referenced by an energy transaction broker, such as energy transaction broker 402 in FIG. 4 for brokering a charging process of an electric vehicle. In particular, the energy transaction broker may reference the energy transaction plan to identify a set of payees, calculate an amount of payment owed by a payee, identify any incentives that may be owed to the and identify sources from which the payment may be made. Thereafter, the energy transaction broker may transfer the identified funds to the set of payees to complete the energy transfer transaction.

Figure 6:
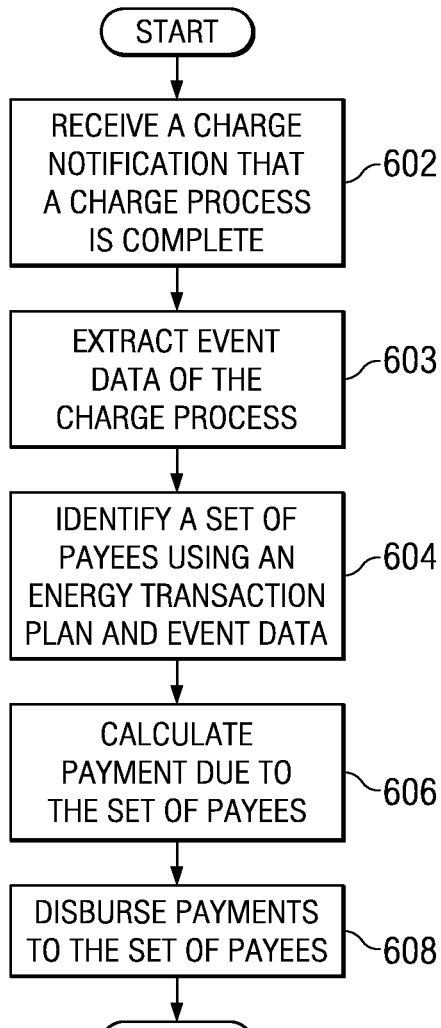
FIG. 6 is a flowchart of a process for brokering a charging process of an electric vehicle in accordance with an illustrative embodiment.

FIG. 6 is a flowchart of a process for brokering a charging process of an electric vehicle in accordance with an illustrative embodiment. The process in FIG. 6 may be implemented by a software component, such as energy transaction broker 402 in FIG. 4.

The process begins by receiving a charge notification that the energy transaction is complete (step 602). The charge notification may be received from a transaction execution engine or energy transaction interrupt monitor. Thereafter, the process extracts event data of the charge process from the charge notification (step 603).

The process then identifies a set of payees (step 604). The process may identify the set of payees by correlating payee identifiers from the event data with an energy transaction plan. The process calculates a payment due to a set of payees (step 606) and then disburses the payment to the set of payees (step 610). The process terminates thereafter.

Figure 7:
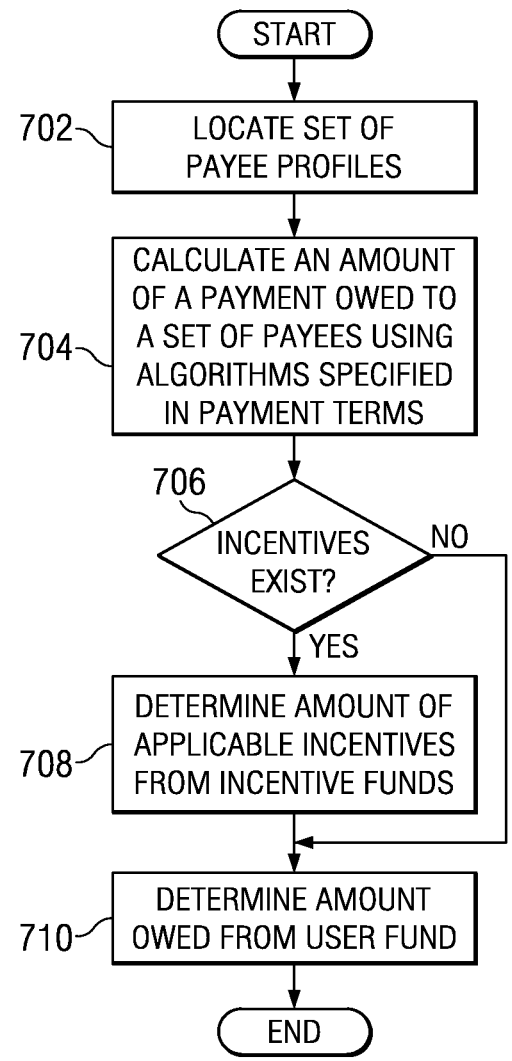
FIG. 7 is a flowchart of a process for calculating payment due to a set of payees in accordance with an illustrative embodiment.

FIG. 7 is a flowchart of a process for calculating payment due to the set of payees in accordance with an illustrative embodiment. The process in FIG. 7 may be implemented by a software component, such as energy transaction broker 402 in FIG. 4.

The process begins by locating a set of payee profiles (step 702). The set of payee profiles may be located by identifying a set of payees from an energy transaction plan. The process then calculates an amount of a payment owed to a set of payees using algorithms specified in payment terms (step 704).

The process then makes the determination as to whether incentives exist (step 706). If the process makes the determination that incentives exist, then the process calculates an amount of incentives applicable to the charging transaction at hand (step 708). The amount of incentives is withdrawn from an incentive fund, such as incentive funds 424 in FIG. 4.

The process then calculates an amount of money owed from a payee fund (step 710) and the process terminates. The amount of money owed from the payee fund is the difference between the amount of payment owed by a user and the amount of incentives applicable to the charging transaction.

Returning now to step 706, if the process makes the determination that incentives do not exist, then the process continues to step 710 and the amount owed from the payee fund is the entire amount of the payment owed.

According to one embodiment, a computer implemented method, apparatus, and computer usable program code is provided for brokering a charging process of an electric vehicle. In one embodiment, a process extracts event data associated with the charging process from a charge notification in response to receiving the charge notification indicating that the charging process of the electric vehicle is complete. The event data may include, but is not limited to, duration of the charging process, quantity of electricity transferred, or rate at which electricity was transferred during the charging process. The process then identifies, from an energy transaction plan, a set of payees participating in the charging process. Thereafter, the process disburses a payment owed to the set of payees. An amount of the payment is calculated using payment terms in profiles of the set of payees. The payment includes funds from at least one of a payer fund and an incentive fund.

The energy transaction broker facilitates the settlement of a charging transaction. The illustrative embodiments show how a centralized energy transaction broker can serve as a settlement agent that identifies parties to the charging transaction, calculates payment owed, and disburses payment according to payment terms of the set of payees. The use of the energy transaction broker simplifies the settlement process by managing the complex interactions with the various parties to the charging transaction.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of managing a charging process of an electric vehicle, the computer implemented method comprising:
   retrieving a set of trip data for a trip;
   using the set of trip data to identify a set of options for replenishing the electric charge of an on-vehicle electric storage mechanism of the electric vehicle for the trip;
   presenting the set of options to the owner or an operator of the electric vehicle;
   responsive to receiving an initiation by the operator, initiating the charging process at a charging station;
   identifying a set of parties of a transaction for replenishing the electric charge of an on-vehicle electric storage mechanism of the electric vehicle;
   the electric vehicle and the charging station exchanging a set of data associated with the charging of the electric vehicle;
   generating a set of terms and conditions from a set of party preferences, a set of current incentives, and a set of device capabilities;
   presenting each of the set of parties with the set of terms and conditions for governing the transaction;
   receiving an approval from each of the set of parties regarding the set of terms and conditions presented;
   responsive to receiving approval performing at least a portion of the transaction;
   responsive to receiving a charge notification that the charging process of the electric vehicle is complete, extracting event data associated with the charging process, wherein the event data is extracted from the charge notification, and wherein the event data comprises a duration of the charging process;
   identifying, from an energy transaction plan, a set of payees participating in the charging process;
   responsive to performing the portion of the transaction, disbursing a payment owed to the set of payees, wherein an amount of the payment is calculated using payment terms in profiles of the set of payees, and wherein the payment comprises funds from at least one of a payer fund and an incentive fund.

2. The computer implemented method of claim 1, further comprising: sending a payment notification to the set of payees informing the set of payees that the payment has been disbursed; and
   wherein the set of payees includes one or more of a utility company, a point of service entity providing a charging station, a government entity specifying a tax applicable to a charging transaction, and any party of the set of parties of the transaction.

3. The computer implemented method of claim 1, further comprising:
   storing a transaction history, wherein the transaction history is derived from the event data and at least includes a time of the charging process, a quantity of electricity transferred, a rate at which electricity was transferred during the charging process, a set of payees participating in the charging process, the date on which a charging process completed, an amount of charge that was delivered to an electric vehicle, a cost of electricity, an overall cost of the charging process, a set of errors that occurred in the processing of the transaction, an identity of the electric vehicle operator who initiated the charging process, the owner of the electric vehicle, the location of the charging station, the date of the charging transaction, a length of time that the electric vehicle was at the charging station, the variable rate of the cost of electricity during the charging transaction, and the utility provider responsible for providing electricity; and processing the stored transaction history to identify a portion of the set of charging stations that receive less patronage; and responsive to identifying the portion of the set of charging stations, generating incentives for the portion of the set of charging stations for a set of operators and owners of electric vehicles.

4. The computer implemented method of claim 1, further comprising:

receiving the energy transaction plan from an energy transaction execution engine.

5. The computer implemented method of claim 1, wherein the incentive fund comprises funds provided by the set of payees; and wherein the set of trip data includes a set of available incentives, a set of weather conditions, a travel route, and a set of traffic information; and wherein the set of available incentives at least includes a discount, or a rebate, or a reward; and wherein the set of parties at least includes the owner of the electric vehicle, the operator of the electric vehicle who initiated the charging process, an owner of the charging station, and an electric utility company providing electricity to an electric power grid associated with the charging station; and wherein the set of data at least includes the capabilities of the electric vehicle, the capabilities of charging station, the current charge stored in electric vehicle, the rate of charging electric vehicle, the price of electricity received from a power grid, identity of the owner, and identity of the operator of the electric vehicle; and wherein the set of party preferences at least includes a maximum price per kilowatt hour of electricity to be paid by a party, a location where charging may occur, a location where charging may not occur, a rate of charging the electric vehicle, and a minimum amount of charge; and wherein the set of device capabilities at least includes a set of charging capabilities of the charging station, a set of charging requirements of the electric vehicle, a maximum storage capacity of the electric vehicle on-vehicle storage mechanism, a existing amount of charge in the electric vehicle, and a number of amps of electricity the charging station is capable of providing.

6. The computer implemented method of claim 1, further comprising:

authenticating the energy transaction plan before sending the payment to the set of payees;

monitoring the network for data transmissions originating from any of the electric power grid, the electric utility company, the charging station, and electric vehicles indicating the transaction should be stopped; and responsive to receiving an indication the transaction should be stopped, performing actions to stop the flow of electric power to the electric vehicle.

7. A computer program product for managing a charging process of an electric vehicle, the computer program product comprising:

a computer-recordable storage media;

first program instructions for retrieving a set of trip data for a trip;

second program instructions for using the set of trip data to identify a set of options for replenishing the electric charge of an on-vehicle electric storage mechanism of the electric vehicle for the trip;

third program instructions for presenting the set of options to the owner or an operator of the electric vehicle;

fourth program instructions for responsive to receiving a initiation by the operator, initiating the charging process at a charging station;

fifth program instructions for identifying a set of parties of a transaction for replenishing the electric charge of an on-vehicle electric storage mechanism of the electric vehicle;

sixth program instructions for exchanging, between the electric vehicle and the charging station, a set of data associated with the charging of the electric vehicle;

seventh program instructions for generating a set of terms and conditions from a set of party preferences, a set of current incentives, and a set of device capabilities;

eighth program instructions for presenting each of the set of parties with a set of terms and conditions for governing the transaction;

ninth program instructions for receiving an approval from each of the set of parties regarding the set of terms and conditions presented;

tenth program instructions for responsive to receiving approval performing at least a portion of the transaction;

eleventh program instructions for extracting event data associated with the charging process in response to receiving a charge notification indicating that the charging process of the electric vehicle is complete, wherein the event data is extracted from the charge notification, and wherein the event data comprises a duration of the charging process;

twelfth program instructions for identifying, from an energy transaction plan, a set of payees participating in the charging process;

thirteenth program instructions for responsive to performing the portion of the transaction, disbursing a payment owed to the set of payees, wherein an amount of the payment is calculated using payment terms in profiles of the set of payees, and wherein the payment comprises funds from at least one of a payer fund and an incentive fund; and wherein the first program instructions, the second program instructions, the third program instructions, the fourth program instructions, the fifth program instructions, the sixth program instructions, the seventh program instructions, the eighth program instructions, the ninth program instructions, the tenth program instructions, the twelfth program instructions, and the thirteenth program instructions are stored on the computer-recordable storage media.

8. The computer program product of claim 7, further comprising:

fourteenth program instructions for sending a payment notification to the set of payees informing the set of payees that the payment has been disbursed, wherein the fourteenth program instructions are stored on the computer-recordable storage media; and wherein the set of payees includes one or more of a utility company, a point of service entity providing a charging station, a government entity specifying a tax applicable to a charging transaction, and any party of the set of parties of the transaction.

9. The computer program product of claim 7, further comprising:
fifteenth program instructions for storing a transaction history, wherein the transaction history is derived from the event data and at least includes a time of the charging process, a quantity of electricity transferred, a rate at which electricity was transferred during the charging process, a set of payees participating in the charging process, the date on which a charging process completed, an amount of charge that was delivered to an electric vehicle, a cost of electricity, an overall cost of the charging process, a set of errors that occurred in the processing of the transaction, an identity of the electric vehicle operator who initiated the charging process, the owner of the electric vehicle, the location of the charging station, the date of the charging transaction, a length of time that the electric vehicle was at the charging station, the variable rate of the cost of electricity during the charging transaction, and the utility provider responsible for providing electricity; and
sixteenth program instructions for processing the stored transaction history to identify a portion of the set of charging stations that receive less patronage; and
seventeenth program instructions for responsive to identifying the portion of the set of charging stations, generating incentives for the portion of the set of charging stations for a set of operators and owners of electric vehicles; and
wherein the fifteenth program instructions, the sixteenth program instructions, and the seventeenth program instructions are stored on the computer-recordable storage media.

10. The computer program product of claim 7, wherein the identifying step further comprises:
eighteenth program instructions for receiving the energy transaction plan from an energy transaction execution engine; and
wherein the eighteenth program instructions are stored on the computer-recordable storage media.

11. The computer program product of claim 7, wherein the incentive fund comprises funds provided by the set of payees; and
wherein the set of trip data includes a set of available incentives, a set of weather conditions, a travel route, and a set of traffic information; and
wherein the set of available incentives at least includes a discount, or a rebate, or a reward; and
wherein the set of parties at least includes the owner of the electric vehicle, the operator of the electric vehicle who initiated the charging process, an owner of the charging station, and an electric utility company providing electricity to an electric power grid associated with the charging station; and
wherein the set of data at least includes the capabilities of the electric vehicle, the capabilities of charging station, the current charge stored in electric vehicle, the rate of charging electric vehicle, the price of electricity received from a power grid, identity of the owner, and identity of the operator of the electric vehicle; and
wherein the set of party preferences at least includes a maximum price per kilowatt hour of electricity to be paid by a party, a location where charging may occur, a location where charging may not occur, a rate of charging the electric vehicle, and a minimum amount of charge; and
wherein the set of device capabilities at least includes a set of charging capabilities of the charging station, a set of charging requirements of the electric vehicle, a maximum storage capacity of the electric vehicle on-vehicle storage mechanism, a existing amount of charge in the electric vehicle, and a number of amps of electricity the charging station is capable of providing.

12. The computer program product of claim 7, further comprising:
nineteenth program instructions for authenticating the energy transaction plan before sending the payment to the set of payees;
twentieth program instructions for monitoring the network for data transmissions originating from any of the electric power grid, the electric utility company, the charging station, and electric vehicles indicating the transaction should be stopped; and
twenty first program instructions for responsive to receiving an indication the transaction should be stopped, performing actions to stop the flow of electric power to the electric vehicle; and
wherein the nineteenth program instructions, the twentieth program instructions, and the twenty first program instructions are stored on the computer-recordable storage media.

13. An apparatus for managing a charging process of an electric vehicle, the apparatus comprising:
a bus system;
a memory connected to the bus system, wherein the memory includes computer usable program code; and
a processing unit connected to the bus system, wherein the processing unit executes the computer usable program code to perform steps including:
retrieving a set of trip data for a trip;
using the set of trip data to identify a set of options for replenishing the electric charge of an on-vehicle electric storage mechanism of the electric vehicle for the trip;
presenting the set of options to the owner or an operator of the electric vehicle;
responsive to receiving an initiation by the operator, initiating the charging process at a charging station;
identifying a set of parties of a transaction for replenishing the electric charge of an on-vehicle electric storage mechanism of the electric vehicle;
the electric vehicle and the charging station exchanging a set of data associated with the charging of the electric vehicle;
generating a set of terms and conditions from a set of party preferences, a set of current incentives, and a set of device capabilities;
presenting each of the set of parties with the set of terms and conditions for governing the transaction;
receiving an approval from each of the set of parties regarding the set of terms and conditions presented;
responsive to receiving approval performing at least a portion of the transaction;
responsive to receiving a charge notification that the charging process of the electric vehicle is complete, extracting event data associated with the charging process, wherein the event data is extracted from the charge notification, and wherein the event data comprises a duration of the charging process;
identifying, from an energy transaction plan, a set of payees participating in the charging process;
responsive to performing the portion of the transaction, disbursing a payment owed to the set of payees, wherein an amount of the payment is calculated using payment terms in profiles of the set of payees, and wherein the payment comprises funds from at least one of a payer fund and an incentive fund.

14. The apparatus of claim 13, wherein the processing unit further executes the computer usable program code to send a payment notification to the set of payees informing the set of payees that the payment has been disbursed; and
wherein the set of payees includes one or more of a utility company, a point of service entity providing a charging station, a government entity specifying a tax applicable to a charging transaction, and any party of the set of parties of the transaction.

15. The apparatus of claim 13, wherein the processing unit further executes the computer usable program code to perform steps including:
storing a transaction history, wherein the transaction history is derived from the event data and at least includes a time of the charging process, a quantity of electricity transferred, a rate at which electricity was transferred during the charging process, a set of payees participating in the charging process, the date on which a charging process completed, an amount of charge that was delivered to an electric vehicle, a cost of electricity, an overall cost of the charging process, a set of errors that occurred in the processing of the transaction, an identity of the electric vehicle operator who initiated the charging process, the owner of the electric vehicle, the location of the charging station, the date of the charging transaction, a length of time that the electric vehicle was at the charging station, the variable rate of the cost of electricity during the charging transaction, and the utility provider responsible for providing electricity; and
processing the stored transaction history to identify a portion of the set of charging stations that receive less patronage; and
responsive to identifying the portion of the set of charging stations, generating incentives for the portion of the set of charging stations for a set of operators and owners of electric vehicles.

16. The apparatus of claim 13, wherein the identifying, from an energy transaction plan, a set of payees participating in the charging process step further comprises:
program instructions for receiving the energy transaction plan from an energy transaction execution engine.

17. The apparatus of claim 13, wherein the incentive fund comprises funds provided by the set of payees; and
wherein the set of trip data includes a set of available incentives, a set of weather conditions, a travel route, and a set of traffic information; and
wherein the set of available incentives at least includes a discount, or a rebate, or a reward; and
wherein the set of parties at least includes the owner of the electric vehicle, the operator of the electric vehicle who initiated the charging process, an owner of the charging station, and an electric utility company providing electricity to an electric power grid associated with the charging station; and
wherein the set of data at least includes the capabilities of the electric vehicle, the capabilities of charging station, the current charge stored in electric vehicle, the rate of charging electric vehicle, the price of electricity received from a power grid, identity of the owner, and identity of the operator of the electric vehicle; and
wherein the set of party preferences at least includes a maximum price per kilowatt hour of electricity to be paid by a party, a location where charging may occur, a location where charging may not occur, a rate of charging the electric vehicle, and a minimum amount of charge; and
wherein the set of device capabilities at least includes a set of charging capabilities of the charging station, a set of charging requirements of the electric vehicle, a maximum storage capacity of the electric vehicle on-vehicle storage mechanism, a existing amount of charge in the electric vehicle, and a number of amps of electricity the charging station is capable of providing.

18. The apparatus of claim 13, wherein the processing unit further executes the computer usable program code to perform steps including:
authenticating the energy transaction plan before sending the payment to the set of payees;
monitoring the network for data transmissions originating from any of the electric power grid, the electric utility company, the charging station, and electric vehicles indicating the transaction should be stopped; and
responsive to receiving an indication the transaction should be stopped, performing actions to stop the flow of electric power to the electric vehicle.

19. A system for managing a charging process of an electric vehicle, the system comprising:
a storage device, wherein the storage device stores a set of payee profiles and a set of trip data for a plurality of trips; and
a data processing system for performing:
retrieving a set of trip data for a trip;
using the set of trip data to identify a set of options for replenishing the electric charge of an on-vehicle electric storage mechanism of the electric vehicle for the trip;
presenting the set of options to the owner or an operator of the electric vehicle;
responsive to receiving an initiation by the operator, initiating the charging process at a charging station;
identifying a set of parties of a transaction for replenishing the electric charge of an on-vehicle electric storage mechanism of the electric vehicle;
the electric vehicle and the charging station exchanging a set of data associated with the charging of the electric vehicle;
generating a set of terms and conditions from a set of party preferences, a set of current incentives, and a set of device capabilities;
presenting each of the set of parties with the set of terms and conditions for governing the transaction;
receiving an approval from each of the set of parties regarding the set of terms and conditions presented;
responsive to receiving approval performing at least a portion of the transaction;
an energy transaction broker of the data processing system, wherein responsive to performing the portion of the transaction, the energy transaction broker extracts event data associated with the charging process, wherein the event data is extracted from a charge notification, and wherein the event data comprises a duration of the charging process in response to receiving a notification that the charging process of the electric vehicle is complete; identifies, from an energy transaction plan, a set of payees participating in the charging process; and disburses a payment owed to the set of payees, wherein an amount of the payment is calculated using payment terms in profiles of the set of payees, and wherein the payment comprises funds from at least one of a payer fund and an incentive fund.

20. The system of claim 19, wherein the energy transaction broker sends a payment notification to the set of payees informing the set of payees that the payment has been disbursed; and wherein the set of payees includes one or more of a utility company, a point of service entity providing a charging station, a government entity specifying a tax applicable to a charging transaction, and any party of the set of parties of the transaction.

\* \* \* \* \*